(12) United States Patent
Gacanin

(10) Patent No.: US 9,462,494 B2
(45) Date of Patent: Oct. 4, 2016

(54) METHOD AND APPARATUS FOR ASSESSING THE QUALITY OF A COMMUNICATION CHANNEL IN A MULTI-DOMAIN NETWORK

(75) Inventor: Haris Gacanin, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 108 days.

(21) Appl. No.: 14/239,815

(22) PCT Filed: Aug. 27, 2012

(86) PCT No.: PCT/EP2012/066593
§ 371 (c)(1),
(2), (4) Date: Feb. 20, 2014

(87) PCT Pub. No.: WO2013/041327
PCT Pub. Date: Mar. 28, 2013

(65) Prior Publication Data
US 2014/0204792 A1    Jul. 24, 2014

(30) Foreign Application Priority Data
Sep. 19, 2011   (EP) .................................... 11306176

(51) Int. Cl.
*H04L 5/00* (2006.01)
*H04W 24/06* (2009.01)
(Continued)

(52) U.S. Cl.
CPC .......... *H04W 24/06* (2013.01); *H04L 25/0226* (2013.01); *H04L 27/2613* (2013.01); *H04L 43/10* (2013.01); *H04L 43/50* (2013.01)

(58) Field of Classification Search
CPC .. H04W 24/06; H04L 5/0053; H04L 5/0055; H04L 5/0057; H04L 27/0006; H04L 5/0058
See application file for complete search history.

(56) References Cited

U.S. PATENT DOCUMENTS

| | | | | |
|---|---|---|---|---|
| 2007/0253465 A1* | 11/2007 | Muharemovic et al. | ..... | 375/130 |
| 2008/0225687 A1* | 9/2008 | Oksman | ..... | 370/201 |

(Continued)

FOREIGN PATENT DOCUMENTS

| | | |
|---|---|---|
| EP | 2383917 A1 | 11/2011 |
| EP | 2525533 A1 | 11/2012 |
| WO | WO-2010087173 A1 | 8/2010 |

OTHER PUBLICATIONS

Oksman V et al: "G.hn: The new ITU-T home networking standard", IEEE Communications Magazine, IEEE Service Center, Piscataway, US, vol. 47, No. 10, Oct. 1, 2009, pp. 138-145.

(Continued)

*Primary Examiner* — Fan Ng
(74) *Attorney, Agent, or Firm* — Harness, Dickey & Pierce, P.L.C.

(57) ABSTRACT

A method for assessing the quality of a communication channel in a multi-domain network includes transmitting, from a device, a probe signal onto the communication channel. The transmitting coordinated with the transmission of at least one alien probe signal by another network node. Subsequently to the transmitting, receiving a mixed feedback signal. The mixed feedback signal including a first component corresponding to the probe signal and a second component corresponding to the at least one alien probe signal. The method further includes extracting the first component from the mixed feedback signal, and assessing the quality of the communication channel on the basis of the extracted first component. The probe signal and the at least one alien probe signal are designed to facilitate their separation after having been superimposed.

6 Claims, 4 Drawing Sheets

(51) Int. Cl.
  *H04L 25/02* (2006.01)
  *H04L 27/26* (2006.01)
  *H04L 12/26* (2006.01)

(56) References Cited

U.S. PATENT DOCUMENTS

2011/0082939 A1* 4/2011 Montemurro et al. ....... 709/227

2011/0287797 A1* 11/2011 Iwai et al. .................... 455/509
2012/0039221 A1*  2/2012 Lim .................. H04L 25/03114
                                                                370/280

OTHER PUBLICATIONS

International Search Report PCT/ISA/210 for International Application No. PCT/EP2012/066593 Dated Dec. 13, 2012.

* cited by examiner

METHOD AND APPARATUS FOR ASSESSING THE QUALITY OF A COMMUNICATION CHANNEL IN A MULTI-DOMAIN NETWORK

This application is the national phase under 35 U.S.C. §371 of PCT International Application No. PCT/EP2012/066593 which has an International filing date of Aug. 27, 2012, which claims priority to European patent application number EP 11306176.6 filed Sep. 19, 2011; the entire contents of each of which are hereby incorporated by reference.

TECHNICAL FIELD

The present invention pertains to the field of home networks, more in particular to the field of data transmission over diverse physical home network segments.

BACKGROUND

In home networks, in particular home networks according to the G.hn family of Recommendations developed by the ITU-T (see ITU-T Rec. G.9961), communication between domains is conducted via domain managers. This architecture has limited scalability and does not allow for true bidirectional interaction across domains. Additionally, known channel probing schemes for such networks tend to be inefficient.

SUMMARY

Accordingly, it is an object of embodiments of the present invention to provide a more efficient channel probing scheme for multi-domain networks.

According to an aspect of the present invention, there is provided a method for assessing the quality of a communication channel in a multi-domain network, the method comprising at a device attached to said communication channel: transmitting a probe signal onto said communication channel, said transmitting being coordinated with the transmission of at least one alien probe signal by another network node; subsequently to said transmitting, receiving a mixed feedback signal, said mixed feedback signal comprising a first component corresponding to said probe signal and a second component corresponding to said at least one alien probe signal; extracting said first component from said mixed feedback signal; and assessing the quality of said communication channel on the basis of said extracted first component; wherein said probe signal and said at least one alien probe signal are designed to facilitate their separation after having been superimposed.

In an embodiment of the method according to the present invention, said probe signal and said at least one alien probe signal have a substantially identical temporal and spectral extent, except for a relative cyclic shift in the time domain.

According to an aspect of the present invention, there is provided a method to be applied in assessing the quality of a plurality of communication channels in a multi-domain network, the method comprising at a bridge attached to said plurality of communication channels: receiving a plurality of coordinated probe signals from said respective communication channels; superimposing said plurality of coordinated probe signals to form a mixed feedback signal; and subsequently to said receiving, transmitting said mixed feedback signal onto said plurality of communication channels; wherein said coordinated probe signals are designed to facilitate their separation after having been superimposed.

In an embodiment of the method according to the present invention, said probe signal and said at least one alien probe signal have a substantially identical temporal and spectral extent, except for a relative cyclic shift in the time domain.

According to an aspect of the present invention, there is provided a computer program configured to cause a processor to carry out the method of any of the preceding claims.

According to an aspect of the present invention, there is provided an apparatus for assessing the quality of a communication channel in a multi-domain network, the apparatus being adapted to produce a probe signal, the apparatus comprising: a physical layer interface, adapted to transmit said probe signal onto said channel, and to subsequently receive a mixed feedback signal from said channel; a filtering agent, operatively connected to said physical layer interface, said filtering agent being configured to extract a component corresponding to said probe signal from said mixed feedback signal; and a probe signal processor, operatively connected to said filtering agent, said probe signal processor being configured to assess the quality of said communication channel on the basis of said extracted component; wherein said probe signal is designed to facilitate its separation after having been superimposed onto a probe signal from a peer apparatus.

In an embodiment, the apparatus according to the present invention further comprises a cyclic shifter configured to apply a cyclic shift to said probe signal prior to transmission by said physical layer interface, said cyclic shift being different from a cyclic shift applied by said peer apparatus.

According to an aspect of the present invention, there is provided an apparatus for bridging a plurality of communication channels in a multi-domain network, the apparatus comprising: a plurality of physical layer interfaces, adapted to transmit and receive signals over respective ones of said plurality of communication channels; and a signal combination agent, operatively connected to said plurality of physical layer interfaces, said signal combination agent being configured to generate, upon receiving probe signals from said physical layer interfaces, a mixed feedback signal representing a superposition of said probe signals; wherein said apparatus is configured to transmit said mixed feedback signal onto said plurality of communication channels.

In an embodiment of the apparatus according to the present invention, said probe signals are designed to facilitate their separation after having been superimposed In an embodiment of the apparatus according to the present invention, said probe signals have a substantially identical temporal and spectral extent, except for a relative cyclic shift in the time domain

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF EMBODIMENTS

Figure 1:
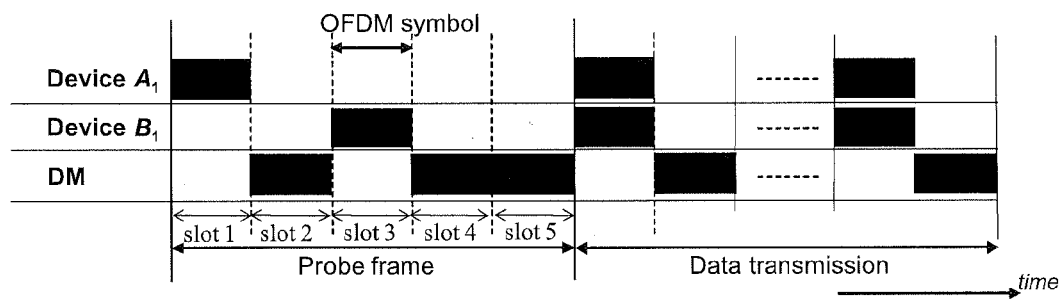
FIG. 1 illustrates channel usage during the channel assessment stage according to a known method.

International Telecommunication Union (ITU) G.hn standard was defined to enable the broadband data communication required by in-house high data rate (i.e., broadband) applications. In G.hn, different domains are available for the in-house network access over different mediums (e.g., the copper twisted-pairs, coax, power line cables). However, the available network resources (e.g., frequency spectrum) are limited by the characteristics of the medium and structure of the network. In general, the G.hn medium(s) can be seen as a broadcast channel(s), where devices share the same medium and available network resources.

To improve spectrum efficiency (i.e., throughput, latency, etc.) a bi-directional mechanism, where both the transmitter and the receiver communicate as a part of the same transmission session, between two nodes may be used for sessions that are bi-directional in nature. One example is transmission control protocol (TCP) session. The bi-directional mechanism in G.hn is available only to nodes communicating directly within the same domain with two service flows:

(i) the forward flow from the originating node to the endpoint node (assigned by the originating node); and (ii) the reverse flow from the endpoint node to the originating node (assigned by the endpoint node).

However, for inter-domain bi-directional communication in G.hn the channel assessment is required for coherent detection. This is a challenging task since multiple devices access the same network resources at the same time based on time division multiple access (TDMA) scheme.

The channel assessment probe frame is specified in current version of ITU-T G.9960 Recommendation. The payload of the probe frame shall contain a number of symbol frames with no data. The number of the symbol frames (and OFDM symbols) shall be indicated in the PHY-frame header via the PRBSYM field and can be of size 4, 8, 12, . . . , 64 OFDM payload symbols in the probe frame. The probe frames (i.e., signals) are sent/received based on TDMA scheme either directly between two devices (where one device acts as a domain master) or via a relay.

Unlike direct (relay-less) and relay-assisted sessions in G.hn home networks, where signals from different users are separated in time to avoid interference, in bi-directional inter-domain G.hn communication, the device's probe signals interfere in the same time slot. Bi-directional inter-domain G.hn communication is described in European patent application no. 11305586.7 in the name of the Applicant, filed on 16 May 2011, the content of which is incorporated in its entirety by this reference.

Hence, in the case of probe transmission, a domain master cannot estimate the CSIs of different home network devices.

Although the invention is described in the context of G.hn networks, the skilled person will understand that this is done for illustrative purposes only, and that the invention is not limited to G.hn networks. Any reference to G.hn or G.hn related terminology should be understood as applying equally to similar multi-domain network architectures. This includes home networks, i.e. networks for residential use.

FIG. 1 diagrammatically illustrates a straightforward method to avoid this problem In G.hn networks, which consists of allocating different 5 time slots, essentially performing probe signaling in a time-division multiple access (TDMA) fashion.

As shown in FIG. 1, the information about the channel must be fed back to the device after each probe transmission. This will reduce the network throughput since the G.hn home network may have a large number of operating devices. Thus, the channel assessment for inter-domain communication in G.hn may be important and limiting factor for different home network services where the content is kept within the network and/or distributed over different domains.

It is an object of the present invention to provide a more efficient channel assessment for inter-domain bi-directional transmission in G.hn home networks. The invention is inter alia based on the insight of the inventor that the throughput, and thus the efficiency, can be improved by reducing the required number of signaling intervals within the probe frames and the domain master. The invention is further based on the insight of the inventor that this reduction can be achieved by judiciously combining the transmission of several signals in a manner that allows reconstruction of the original signals.

G.hn supports multi-port device functionality that can be exploited to enable efficient inter-domain bi-directional transmission. In this example we consider inter-domain bi-directional communication between two devices $A_1$ and $B_1$ from different domains A and B, respectively.

Figure 2:
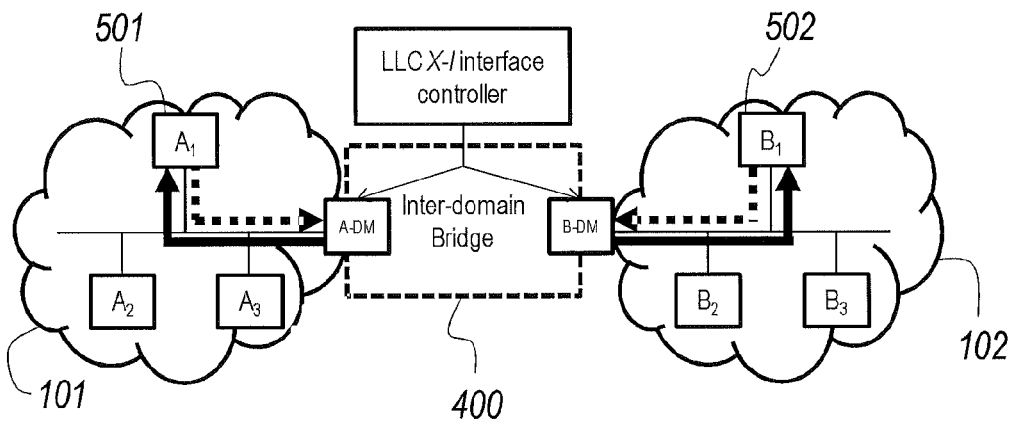
FIG. 2 schematically illustrates an exemplary network architecture in which embodiments of the present invention may be deployed.

FIG. 2 provides a schematic representation of the proposed architecture of a network, preferably a home network, more preferably a G.hn network, comprising two domains 101, 102 (corresponding for instance to the aforementioned domains A and B), where two partner devices 501, 502 (corresponding for instance to the aforementioned devices $A_1$ and $B_1$) ask for the network resources to send their corresponding probe signals.

The LLC function of the Inter-domain bridge 400 triggers a new logical interface (henceforth X-I interface) to initiate the inter-domain mechanism between the targeted pair of devices 501, 502. Acting as a reservation protocol, the X-I interface coordinates the transmission at the same time between them according to the partner list. Finally, the two devices 501, 502 are ready to start with transmission over the designated inter-domain bridge (IDB) 400 by using the allocated time signaling intervals.

Figure 3:
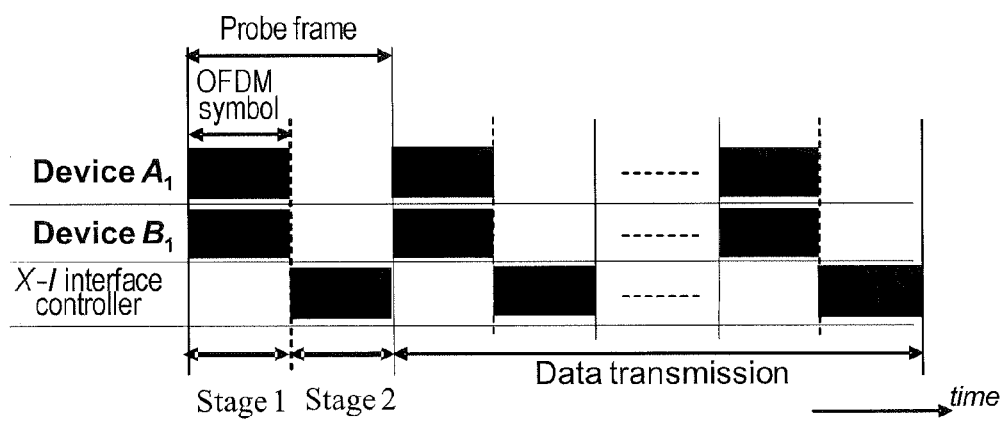
FIG. 3 illustrates channel usage during the channel assessment stage according to an embodiment of the present invention.

With reference to FIG. 3, the two stages of the channel probing scheme according to the present invention will now be described in more detail.

In the first time slot, identified as "Stage 1" in FIG. 3, both devices $A_1$ and $B_1$ (501, 502) send their respective probe signals $P_A$ and $P_B$, to the corresponding multi-port DMs (see FIG. 2), which are interconnected over the LLC function with designated IDB node 400.

The probe signals $P_A$ and $P_B$ from both devices are designed in such way so as to avoid interference during Stage 1. In that way, both devices $A_1$ and $B_1$ (501, 502) can access the network resources at the same time. This constraint can be met by cyclically shifting one of the probe signals (e.g., $P_B$ of $B_1$) in the time domain. Consequently, the frequency spectrum of the probe signal $P_B$ will be shifted in the frequency domain with respect to the frequency spectrum of the probe signal $P_A$ of device $A_1$. Accordingly, the frequency domain envelopes of the probe signals as received through the respective channels will not overlap, which in turn allows the receivers to extract the corresponding channel transfer function in the frequency domain without interference from the partner device's probe signal.

For illustrative purposes only, the above concept can be further explained by the following mathematical derivation.

Without loss of generality, we consider a first probe signal $p_A$, associated with domain A, and a second probe signal $p_B$, associated with domain B, where $p_B$ is in fact a cyclically delayed version of the same probe signal, such that, in the time domain, the following expression holds true:

$$p_B(t) = p_A(t \bmod \alpha)$$

where "mod" denotes the modulo operator.

Turning to a frequency domain representation, and using $H_A$ and $H_B$ to denote the channel matrices of domains A and B, respectively, the combined probe signal as received at the inter-domain bridge 400 can be expressed as follows:

$$R = H_A p_A + H_B p_B = H_A p_A + H_B p_A e^{-i\phi(\alpha)}$$

Mathematically, the situation is therefore equivalent to receiving the single probe signal $p_A$ through a combined channel with the following associated channel matrix:

$$\hat{H} = H_A + H_B e^{-i\phi(\alpha)}$$

the value of which can be estimated by calculating $$\hat{H} = \frac{R}{P}$$

where R represents the received combined probe signal. With a suitable choice of $\phi$ (which is in turn achieved by a suitable choice of $\alpha$), it can be ensured that $H_A$ and $H_B$ can be separately determined in the expression for $\hat{H}$, such that the distortions introduced by the respective media of domains A and B can be assessed individually.

In the second time slot, identified as "Stage 2" in FIG. 3, the probe signals as received on different ports of IDB node 400 are superimposed. Next, the IDB 400 causes the combined probe signals to be broadcast by A-DM and B-DM in their respective domains.

If more than two devices are used in the scheme according to the present invention, the cyclic shift parameters should be designed to avoid spectrum overlapping in the frequency domain for every pair of probe signals, while keeping in mind that the shift should be larger than the guard interval. Consequently, by using the cyclic shift parameters and partner list, the IDB 400 is able to initiate and coordinate channel assessment for inter-domain bi-directional communication between two devices from different domains.

Figure 4:
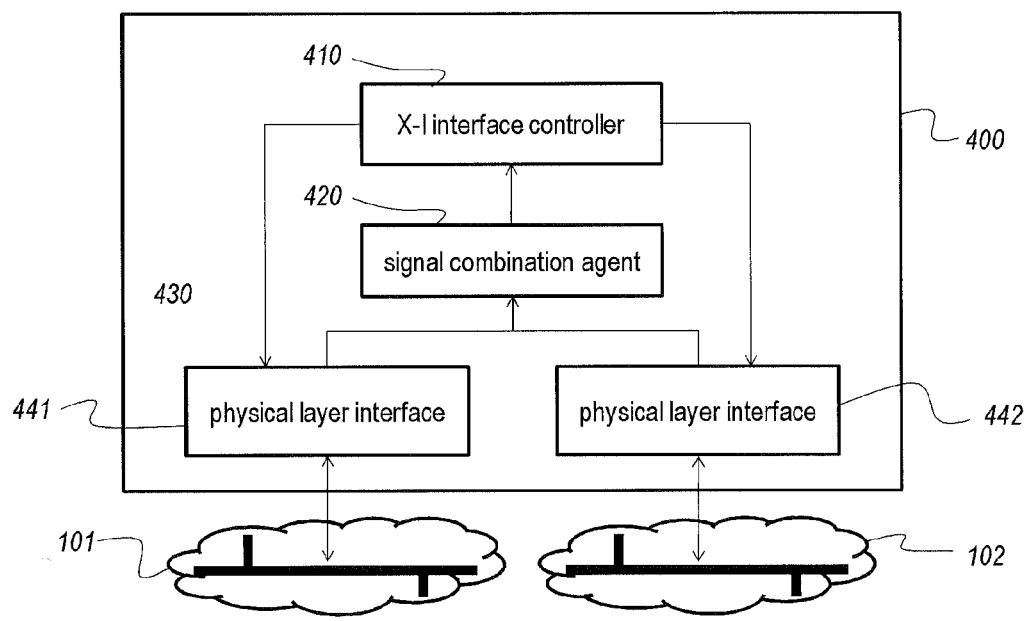
FIG. 4 schematically illustrates an apparatus according to an embodiment of the present invention.

An exemplary IDB node 400 according to an embodiment of the present invention is schematically illustrated in FIG. 4. The node 400 is capable of being operatively connected to at least two domains 101, 102 (corresponding for instance to the aforementioned domains A and B), via appropriate physical interfaces 441, 442. Probe signals that are substantially simultaneously received at these physical interfaces 441, 442 are relayed to a signal combination agent 420. The received probe signals are cyclically shifted relative to each other as described above. Additionally, a small amount of non-cyclic relative delay may be due to different propagation delays in the respective domains 101, 102.

The combined probe signal as generated by the signal combination agent 420 is made available to the transmission logic of the node 400, preferably the X-I interface controller 410, which causes the combined probe signal to be broadcast on the target domains 101, 102, as feedback information for the originating devices in these domains.

The channel assessment at the receiver ends 501, 502 is rather simple. For the purpose of this description and without loss of generality, the receiver ends 501, 502 are assumed to correspond to the aforementioned devices $A_1$ and $B_1$. Since both $A_1$ and $B_1$ know their own respective probe signals, they are each preferably configured to subtract any interference caused by that their own respective signal, which may be present as "echo" at the destination. The corresponding channel information is subsequently estimated in the frequency domain between $A_1$ and the partner device $B_1$ by first dividing the received signal with the transmitted probe signal to obtain an estimate of the "combined" channel transfer function, and then decomposing this "combined" channel transfer function into the contributions of the respective domains 101, 102. Assuming the probe signals were designed to be decomposable by applying the cyclic shift as described above, knowledge of the cyclic shift parameter allows restoring the frequency spectrum of the channel back to its original form. It will be understood that in the scheme according to the present invention, only a relative cyclic shift is required to render the combined signals decomposable, so it is possible to have one probe signal that is not shifted.

Figure 5:
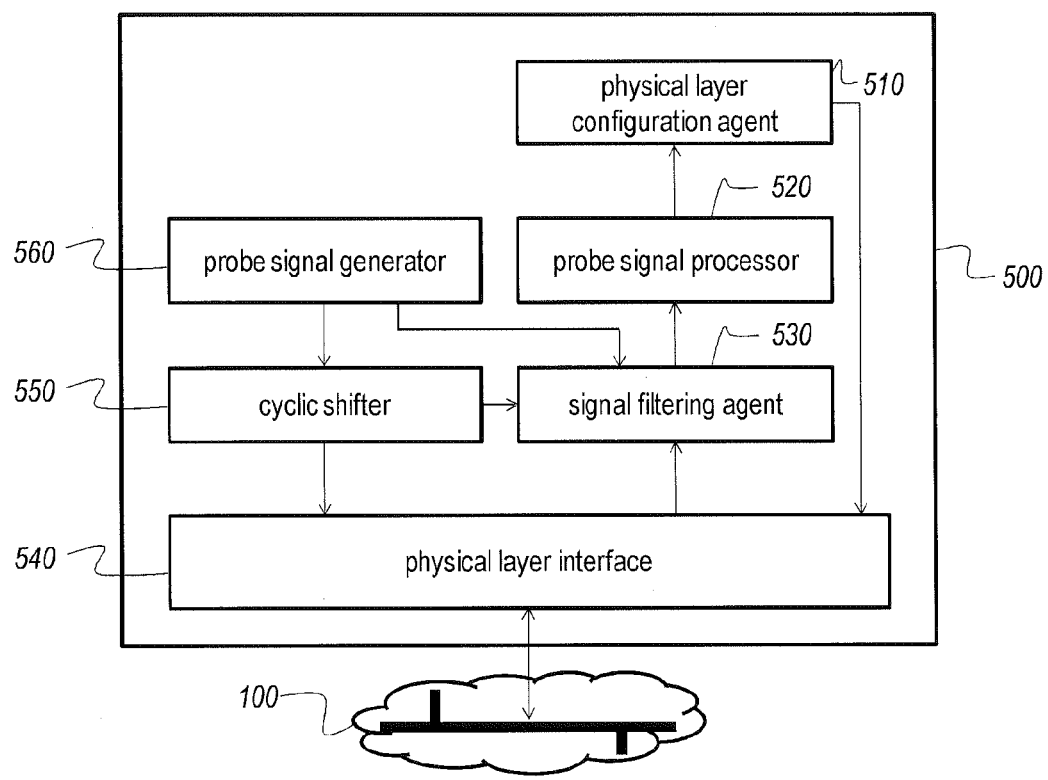
FIG. 5 schematically illustrates an apparatus according to another embodiment of the present invention.

An exemplary embodiment of a device 500 according to an embodiment of the present invention is schematically illustrated in FIG. 5. The devices 501, 502 of the description above may be implemented according to the architecture of device 500. The device 500 is capable of being operatively connected to at least one domain 100 (corresponding for instance to one of the aforementioned domains A and B), via an appropriate physical interface 540. The device 500 comprises a probe signal generator 560 configured to generate an appropriate probe signal for transmission over the domain 100 via the physical layer interface 540. Prior to transmission, the probe signal is cyclically shifted by the cyclic shifter 550, if necessary. The term "probe signal generator" must not be interpreted to imply that the probe signal is generated on-the-fly in the device 500; the generator may retrieve a standardized probe signal from a memory, and present this to the cyclic shifter 550 for further processing. Alternatively, the generator may retrieve a pre-shifted probe signal from a memory, and present this for transmission to the physical layer interface 540.

The feedback signal corresponding to the probe signal, consisting of a reflected superposition of the original probe signal and that of one or more other devices, is received at the physical interfaces 540 and relayed to the signal filtering agent 530. The signal filtering agent 530 may be operatively connected to the probe signal generation 560 to receive information about the transmitted probe signal from the latter for interference cancellation purposes. Furthermore, the signal filtering agent 530 uses the special mathematical properties of the combined feedback signal to separate the relevant reflection of the device's own probe signal. The signal filtering agent 530 is operatively connected to the cyclic shifter 550 or otherwise capable of obtaining information about the cyclic shift that was applied to the transmitted probe signal, in order to remove the shift from the received version of the signal.

The device 500 further comprises logic, designated as probe signal processor 520, configured to analyze the received feedback in order to assess the properties of the physical medium. A physical layer configuration agent 510 preferably uses the results of this assessment to determine the most appropriate physical layer transmission parameters, and to configure the physical layer interface accordingly.

The functions of the various elements shown in the figures, including any functional blocks labeled as "processors", "controllers", or "agents", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Figure 6:
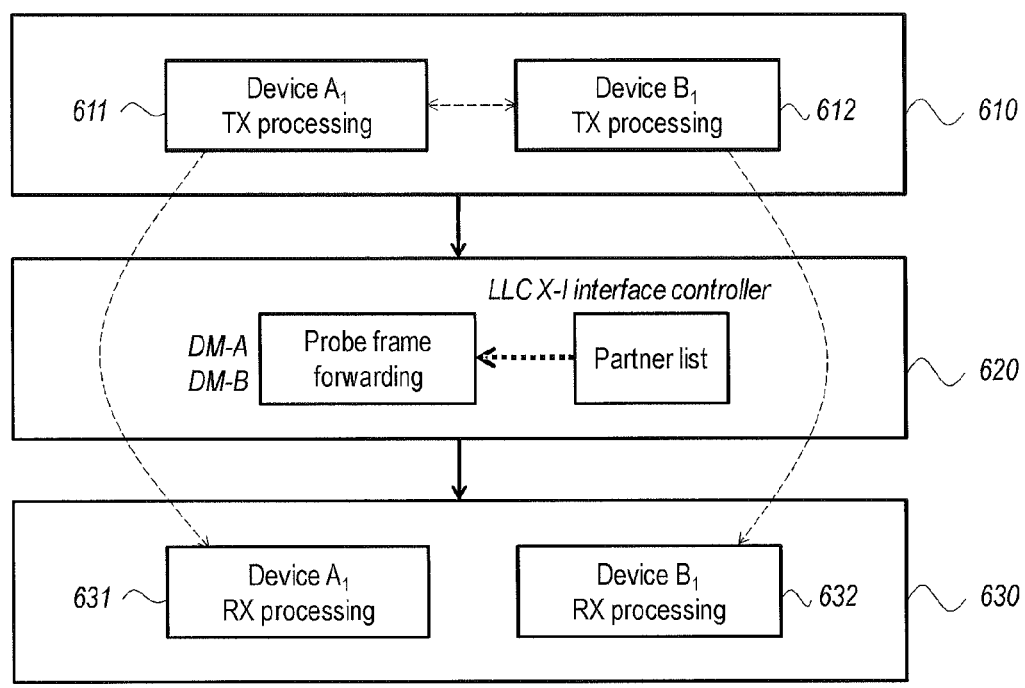
FIG. 6 schematically illustrates the interaction between elements of an embodiment of the present embodiment.

The proposed method procedure flow is illustrated by the flow diagram of FIG. 6.

A first step 610 represents processing carried out by the devices 501, 502 attached to the respective domains 101, 102. Device $A_1$ 501 prepares its probe signal $p_A$ in sub-step 611, and device $B_1$ 502 prepares its probe signal $p_B$ in sub-step 612. These sub-steps 611, 612 are appropriately coordinated to ensure that the resulting probe signals $p_A$ and $p_B$ are subjected to a relative cyclic shift (this implies that only at least one of the signals $p_A$ and $p_B$ needs to undergo an actual shift). This coordination is schematically represented by the dashed double arrow between the boxes representing sub-steps 611 and 612.

A second step 620 represents the processing at the IDB 400, which implies interaction between the domain managers DM-A and DM-B associated with the respective domains A and B on the one hand, and the LLC X-I interface controller, which is responsible for coordinating the transmissions on said domains, on the other hand. The LLC X-I interface controller maintains a partner list for this purpose, which in the example used above includes a partnership between $A_1$ and $B_1$.

A third step 630 again represents processing carried out by the devices 501, 502 attached to the respective domains 101, 102. Device $A_1$ 501 receives the combined retransmitted probe signal in sub-step 631, and device $B_1$ 502 receives the combined retransmitted probe signal in sub-step 632. No further coordination between the sub-steps 631, 632 is necessary at this point, provided that both devices are aware of the relative cyclic shift that was applied in the first step 610. Further processing of the received combined retransmitted probe signal is then applied as explained in connection with FIG. 5.

The result of applying the method according to the described embodiment of the invention is that each device 501, 502 has access to the feedback signal corresponding to the probe signal it transmitted. This access is represented by the dashed arrows from the TX processing sub-steps 611 and 612 to the RX processing sub-steps 631 and 632, respectively.

A person of skill in the art would readily recognize that steps of various above described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for assessing a quality of a communication channel in home network where communication between domains is conducted via domain managers, the method comprising at a device attached to said communication channel:

transmitting a probe signal onto said communication channel in a first time slot, said transmitting being coordinated with a transmission in said first time slot of at least one alien probe signal by another network node, subsequent to said transmitting, receiving a mixed feedback signal, said mixed feedback signal including a first component corresponding to said probe signal and a second component corresponding to said at least one alien probe signal;

extracting said first component from said mixed feedback signal; and assessing the quality of said communication channel based on said extracted first component; wherein said probe signal and said at least one alien probe signal have identical temporal and spectral characteristics, except for a relative cyclic shift in the time domain, so as to facilitate a separation of said probe and said at least one alien probe signal after having been entirely superimposed.

2. A non-transitory computer readable medium comprising computer readable instructions, which when executed by a processor, cause the processor to perform the method of claim 1.

3. A method for assessing a quality of a plurality of communication channels in a home network where communication between domains is conducted via domain managers, the method comprising at a bridge attached to said plurality of communication channels:

receiving a plurality of coordinated probe signals from said respective communication channels in a first time slot;

superimposing said plurality of coordinated probe signals to form a mixed feedback signal;

subsequent to said receiving, transmitting said mixed feedback signal onto said plurality of communication channels; wherein said plurality of coordinated probe signals have identical temporal and spectral characteristics, except for a relative cyclic shift in a time domain so as to facilitate a separation of plurality of coordinated probe signals after having been entirely superimposed.

4. An apparatus configured to assess a quality of a communication channel in a home network where communication between domains is conducted via domain managers, the apparatus being configured to produce a probe signal, the apparatus comprising:

a physical layer interface, configured to, transmit said probe signal onto said channel, in a first time slot, said physical layer interface being configured to coordinate the transmission of said probe signal with a transmission in said first time slot of at least one alien probe signal by another network node, and subsequent to said transmission of said probe signal, receive a mixed feedback signal from said channel, said mixed feedback signal including a first component corresponding to said probe signal and a second component corresponding to said at least one alien probe signal;

a processor configured to, connect to said physical layer interface, extract a component corresponding to said probe signal from said mixed feedback signal, and assess the quality of said communication channel based on said extracted component, wherein said probe signal and said at least on alien probe signal have identical temporal and spectral characteristics, except for a relative cyclic shift in the time domain, so as to facilitate a separation of said probe signal and said at least one alien probe signal after having been entirely superimposed.

5. The apparatus according to claim 4, further comprising:

a cyclic shifter configured to apply the relative cyclic shift to said probe signal prior to transmission by said physical layer interface, said cyclic shift being different from a cyclic shift applied to the at least one alien probe signal by said other network node.

6. An apparatus for bridging a plurality of communication channels in a home network where communication between domains is conducted via domain managers, the apparatus comprising:

a plurality of physical layer interfaces configured to transmit and receive signals over respective ones of said plurality of communication channels;

a processor configured to, connect to said plurality of physical layer interfaces, generate, upon receiving in a first time slot probe signals from said physical layer interfaces, a mixed feedback signal representing a superposition of said probe signals; and transmit said mixed feedback signal onto said plurality of communication channels; wherein said probe signals have identical temporal and spectral characteristics, except for a relative cyclic shift in the time domain so as to facilitate a separation of said probe signals after having been entirely superimposed.

* * * * *